3,181,731
LIQUID PROPORTIONER
Charles A. Ellis, Portola Valley, Calif., assignor to Skasol Incorporated, San Francisco, Calif., a corporation of California
Filed Apr. 12, 1963, Ser. No. 272,773
5 Claims. (Cl. 222—57)

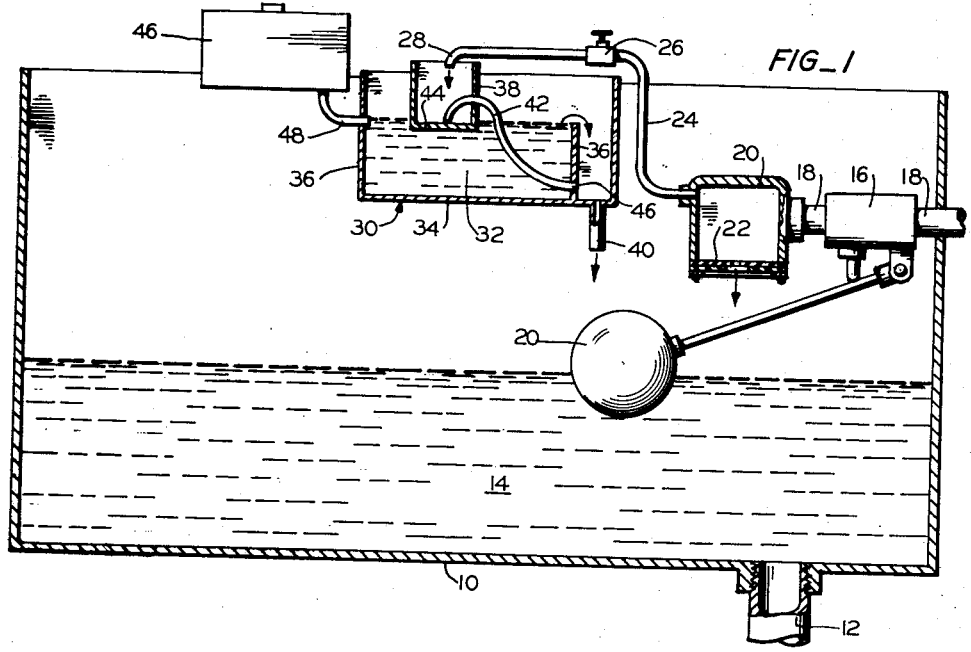
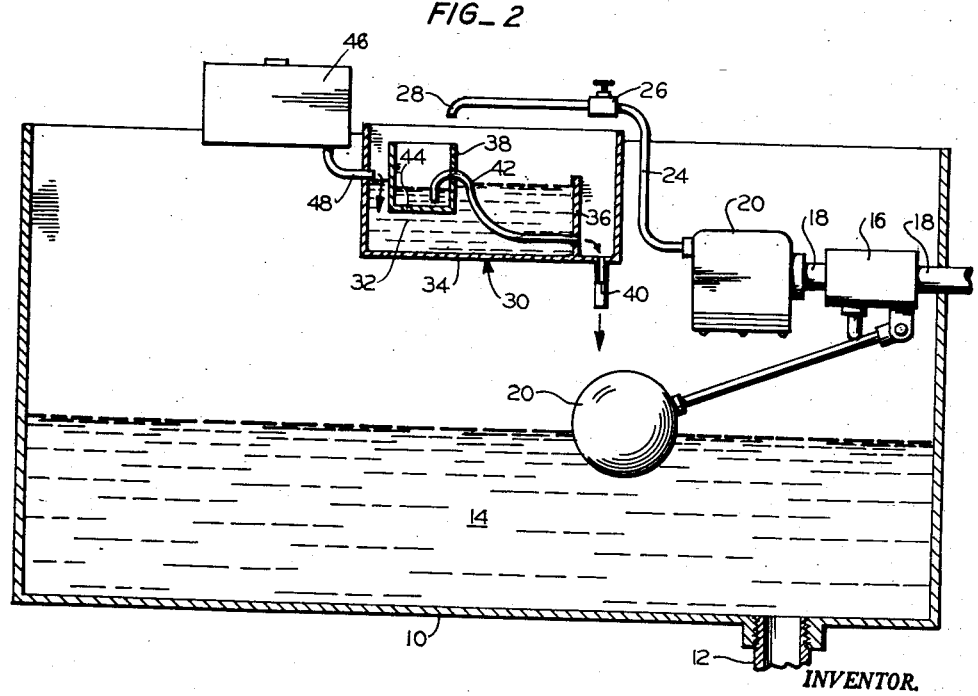

This invention relates to liquid handling apparatus and more particularly to new apparatus for maintaining a predetermined concentration of a chemical treating agent in a body of liquid and to a new reservoir for such treating agent.

In the operation of many types of water cooling systems, boilers and the like, a body of circulating liquid is provided in which it is desirable to maintain a predetermined concentration of a chemical treating agent which reduces corrosion in the system or provides some other advantageous effect. In most of these systems, fresh water must be added continuously to replace water which is lost through evaporation, transportation out of the system on articles being treated, etc. and since fresh water must be added to the system, fresh treating agent must be added to maintain the predetermined concentration. The fresh treating agent may be added by providing a reservoir of water containing the predetermined concentration of agent, but where the treating agent is employed in very small concentrations and where large volumes of replacement water are necessary, it is impractical to add the treating agent in this manner.

It is an object of this invention to provide apparatus by which treating agents may be added to liquid handling systems to maintain a predetermined concentration of the treating agent in the liquid while permitting the replacement treating agent to be dispensed in the form of a concentrate which may be stored in a relatively small concentrate reservoir in the apparatus.

It is another object of the invention to provide such apparatus which will maintain the predetermined concentration of treating agent in the liquid system automatically as the volume of fresh liquid added to the system varies between widely spaced limits.

It is another object of the invention to provide such apparatus which is very simple and inexpensive in construction and which employs a minimum number of moving parts so that the apparatus may be used for long periods of time with little attention aside from periodic replenishment of the chemical treating agent in the reservoir.

It is another object of the invention to provide a new reservoir for such apparatus whereby the reservoir is operative to deliver small controlled quantities of a treating agent for long periods of time without any attention from an operator.

It is another object of the invention to provide such a reservoir which will dispense a treating agent by direct displacement of the treating agent from the reservoir responsive to the addition of liquid to the reservoir without mixing the liquid and the treating agent and where the reservoir will be operative to periodically readjust itself to exhaust its accumulated supply of the displacing liquid and take on a new supply of the displaceable treating agent.

Other objects and advantages of the invention will become apparent from the following description read in conjunction with the attached drawings in which:

FIG. 1 is a view in side elevation of apparatus constructed in accordance with this invention illustrating the apparatus in its normal condition of operation, and FIG. 2 is a view similar to FIG. 1 illustrating the condition of the apparatus as it readjusts itself to discharge an accumulated amount of the displacing liquid.

Referring now in detail to the drawings and particularly to FIG. 1, there is there illustrated a portion of a liquid circulating system such as a water cooling plant, this portion including a header 10 having a delivery conduit 12 through which circulating liquid 14 passes from the header to the remainder of the system. The water leaving conduit 12 may be returned to the header, or a variety of other means may be provided by which the liquid level in the header varies with the quantity of liquid in the system. A float valve 16 is mounted on an inlet conduit 18 and carries a float arm 20 which follows the liquid level in the header 10 and opens the valve 16 to provide an increasing volume of water entering the header responsive to lowering of the liquid level in the header. A volume to pressure converter 20, described in greater detail in an application filed herewith, is connected to the inlet conduit 18 and has an apertured flexible wall 22 through which the incoming liquid passes to the body of liquid 14 while creating an increasing liquid pressure in the converter 20 as increasing volumes of liquid pass therethrough.

A bypass conduit 24 is connected to the converter 20 to convey from the converter 20 a very small stream of liquid the volume of which is a function of the pressure in the converter, and a needle valve 26 is provided in the conduit 24 to permit the volume of liquid passing through the conduit to be adjusted. The liquid passing through the conduit 24 is delivered from a discharge spout 28 into a reservoir 30 from which a liquid treating agent 32 is dispensed into the body of liquid 14.

The reservoir 30 has bottom and side walls 34 and 36 respectively which define an outer reservoir body in which the liquid treating agent 32 is contained, and an inner reservoir 38 is provided floating in the body of treating agent 32. The inner reservoir 38 is positioned underneath the discharge spout 28 to receive therefrom the liquid passing through the conduit 24 so that as the liquid from the conduit 24 drops into the reservoir 38, the reservoir 38 sinks into the body of liquid 32 displacing some of the treating agent 32 over the right hand wall 36 to be discharged through a spout 40 into the body of liquid 14.

A siphon tube extends through one of the side walls of the inner reservoir 38 at a position part way up the side wall with one end of the tube 42 lying closely adjacent to the bottom 44 of the inner reservoir and with the other end of the tube 42 communicating with the discharge spout 40 at a point 46 which is below the level to which the bottom of the inner reservoir 38 sinks in the treating agent.

When a sufficient amount of liquid has been delivered from the spout 28 into the inner reservoir 38 so that the inner reservoir has sunk in the treating agent 32 to a position where the liquid in the inner reservoir 38 starts to flow out of the siphon tube 42, the siphon tube 42 proceeds to act as a siphon to substantially completely empty the inner reservoir 38 causing it to rise up out of the body of treating agent 32 in the outer reservoir. This condition is illustrated in FIG. 2 where liquid flowing from the inner reservoir is conveyed to the spout 40 by the siphon tube 42.

An unvented auxiliary reservoir 46 of the treating agent 32 is mounted adjacent to the reservoir means 30 and communicates with the body of treating agent 32 in the outer reservoir by means of a tube 48 below the level of the top of the right overflow wall 36 and above the level to which liquid 32 in the outer reservoir will fall as the inner reservoir 38 is emptied by the siphon tube 42. Thus, as will be seen in FIG. 2, when the inner reservoir 38 is emptied by the siphon tube 42 so that the inner reservoir rises out of the outer reservoir, the liquid level in the outer reservoir goes down to a position where air is permitted to enter the auxiliary reservoir tube 48, releasing the suction condition in the top of the auxiliary reservoir 46 so that fresh treating agent flows from the auxiliary reservoir 46 into the outer reservoir body of treating agent 32 to replenish the volume of treating agent therein as the inner reservoir 38 is emptied.

In this manner, a liquid treating agent 32 is continuously displaced from the outer reservoir responsive to the delivery of equal weights of liquid from the pressure converter 20 without permitting the treating agent in the outer reservoir 32 to become diluted by that liquid. Additionally, the inner reservoir 38 automatically empties itself periodically, and when it empties itself, the quantity of treating agent 32 previously displaced from the outer reservoir is replenished from the auxiliary reservoir 46. The inner and outer reservoirs 38 and 32 may be relatively small, while the auxiliary reservoir 46 may be relatively large and may be replaced periodically without interrupting the operation of the reservoir means 30.

While one particular embodiment of this invention has been illustrated and described in detail herein, it is obvious that many modifications thereof may be made without departing from the spirit and scope of the invention.

I claim:

1. Reservoir means for displacing a quantity of a first liquid equal to the quantity of a second liquid delivered thereto without mixing said liquids which comprises:
   (A) an outer reservoir containing a quantity of said first liquid with said outer reservoir having an overflow permitting displacement of said liquid therefrom,
   (B) first liquid supply means for adding said first liquid to said outer reservoir automatically when the liquid level therein falls below a first predetermined level,
   (C) an inner reservoir floating in said outer reservoir and positioned to receive the second liquid delivered to said reservoir means to displace said first liquid from said outer reservoir responsive to sinking of said inner reservoir in said outer reservoir, and
   (D) second liquid removal means for automatically emptying said inner reservoir periodically when the liquid level therein rises to a second predetermined level,
   (E) the volume of said inner reservoir which is submerged in said outer reservoir when said inner reservoir is filled up to said second predetermined level being greater than the volume of said outer reservoir above first predetermined level.

2. The reservoir means of claim 1 in which said first liquid supply means comprises an unvented container above said first predetermined level and containing a quantity of said first liquid communicating with said outer reservoir at said first predetermined level.

3. The reservoir means of claim 1 in which said second liquid removal means comprises a siphon tube extending between a point in said inner reservoir adjacent to the bottom thereof and a point outside said outer reservoir below the bottom of said inner reservoir with said siphon tube having an intermediate portion of maximum height above the bottom of said inner reservoir and at about said second predetermined level.

4. In a liquid handling system having a body of liquid with a variable liquid level, a liquid inlet conduit for delivering replacement liquid to said body of liquid, and a liquid level responsive valve in said inlet conduit for increasing the volume of liquid delivered from said inlet conduit responsive to reduction in the liquid level of said body of liquid, the improved means for maintaining a predetermined concentration of a chemical treating agent in said body of liquid which comprises:
   (A) pressure discharge means for increasing the pressure of liquid delivered from said inlet conduit responsive to increases in the volume of said liquid, said pressure discharge means having
      (1) a chamber communicating with said inlet conduit and
      (2) outlet means for liquid flow from said chamber to said body of liquid with the area of said outlet means through which liquid flows increasing as the liquid pressure in said chamber increases,
   (B) reservoir means containing a liquid chemical treating agent to be displaced into said body of liquid, said reservoir means comprising
      (1) an outer reservoir containing a quantity of said treating agent with said outer reservoir having an overflow permitting displacement of said treating agent therefrom into said body of liquid,
      (2) liquid supply means for adding said treating agent to said outer reservoir automatically when the liquid level therein falls below a first predetermined level,
      (3) an inner reservoir floating in said outer reservoir to displace treating agent from said outer reservoir to sinking of said inner reservoir in said outer reservoir when liquid is delivered to said inner reservoir, and
      (4) liquid removal means for automatically emptying said inner reservoir periodically when the liquid level therein rises to a second predetermined level,
      (5) the volume of said inner reservoir which is submerged in said outer reservoir when said inner reservoir is filled up to said second predetermined level being greater than the volume of said outer reservoir above said first predetermined level, and
   (C) conduit means connecting said reservoir means to said chamber for delivering increasing amounts of liquid to said inner reservoir from said chamber responsive to increasing pressure in said chamber.

5. The apparatus of claim 4 in which said liquid supply means comprises an unvented container above said first predetermined level and containing a quantity of said treating agent communicating with said outer reservoir at said first predetermined level, and said liquid removal means comprises a siphon tube extending between a point in said inner reservoir adjacent to the bottom thereof and a point outside said outer reservoir below the bottom of said inner reservoir and positioned to deliver liquid therefrom to said body of liquid, said siphon tube having an intermediate portion of maximum height above the bottom of said inner reservoir and at about said predetermined level.

References Cited by the Examiner

UNITED STATES PATENTS 1,244,585  10/17  Case _____ 222—319
2,527,927  10/50  Grow _____ 222—319 X LOUIS J. DEMBO, *Primary Examiner.*

HADD S. LANE, *Examiner.*